United States Patent [19]

Sacchetti

[11] Patent Number: 5,136,213

[45] Date of Patent: Aug. 4, 1992

[54] MOTION DETECTING LIGHT CONTROLLER SYSTEM

[75] Inventor: Peter J. Sacchetti, Framingham, Mass.

[73] Assignee: C&K Components, Inc., Newton, Mass.

[21] Appl. No.: 524,708

[22] Filed: May 17, 1990

Related U.S. Application Data

[63] Continuation-in-part of Ser. No. 371,527, Jun. 26, 1989, abandoned.

[51] Int. Cl.⁵ .................................................. H05B 37/02
[52] U.S. Cl. ..................................... 315/159; 315/53; 250/551; 340/541
[58] Field of Search ................. 315/159, 155, 156, 71, 315/53; 250/551; 340/541, 554, 555

[56] References Cited

U.S. PATENT DOCUMENTS

| | | | |
|---|---|---|---|
| 3,281,817 | 10/1966 | Archer | 340/555 |
| 3,694,692 | 9/1972 | Pressman | 315/156 |
| 3,890,534 | 6/1975 | Horowitz | 315/159 |
| 3,900,763 | 8/1975 | Turner | 315/159 |
| 4,207,501 | 6/1980 | Smallegan | 315/156 |
| 4,588,926 | 5/1986 | Pezzolo | 315/159 |
| 4,658,145 | 5/1987 | Awaji | 250/551 |
| 4,873,469 | 10/1989 | Young et al. | 315/155 |

Primary Examiner—Eugene R. LaRoche
Assistant Examiner—Son Dinh

[57] ABSTRACT

A motion detecting light controller system which includes a light bulb socket adapter having a control circuit for the light which is controlled. The control circuit utilizes a first LED and a second LED, the first and second LEDs electrically isolated from the 120 v AC line which powers the remaining part of the circuit. Combinations of Led's and photo cells activate and deactivate a power switching triac. The control circuit includes a latching function which is obtained and maintained by optical means.

3 Claims, 2 Drawing Sheets

MOTION DETECTING LIGHT CONTROLLER SYSTEM

This is a continuation-in-part of co-pending application Ser. No. 07/371,527 filed on 06/26/89, now abandoned.

BACKGROUND OF THE INVENTION

Field of the Invention

This invention relates to a light controller system and more specifically to a motion detecting light controller system.

SUMMARY OF THE INVENTION

The invention disclosed herein is directed at a motion detecting light controller system comprising a motion detector, a power source, a light bulb socket adapter, a 120 v AC line, and a light, the light bulb socket adapter connected to the 120 v AC line and to the motion detector, the light bulb socket adapter including a control circuit for the light and the light electrically connected to the control circuit, the control circuit having a first LED and a second LED, the first and second LEDs electrically isolated from the 120 v AC line. The control circuit includes a latching function which is obtained and maintained by optical means.

BRIEF DESCRIPTION OF THE DRAWINGS

Futher details are explained below with the help of the example(s) illustrated in the attached drawings in which.

DESCRIPTION OF THE PREFERRED EMBODIMENT(S)

Figure 3:
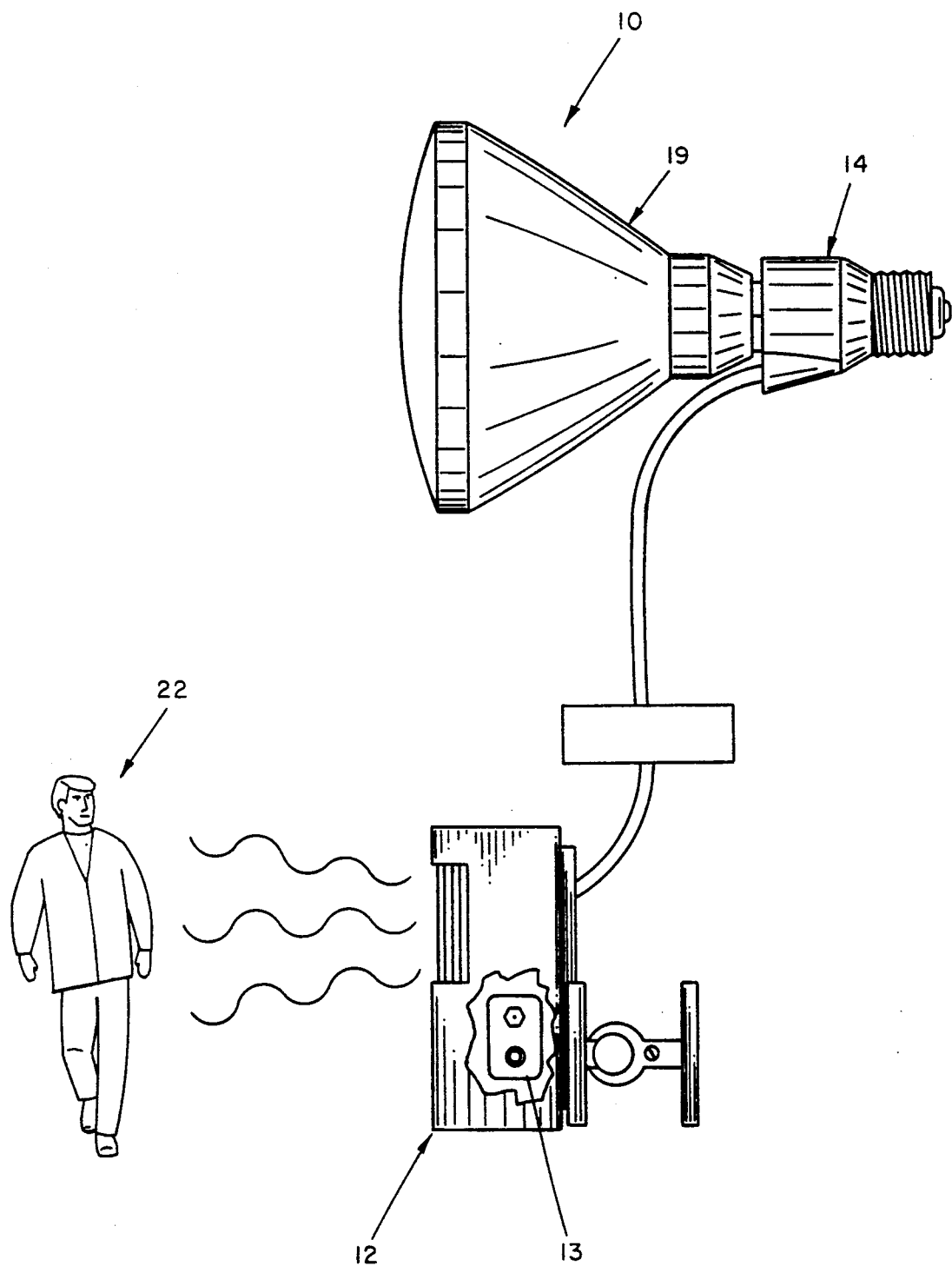
FIG. 3. is a pictorial representation of the motion detecting light controller system according to the present invention.

There is shown in the drawings at FIG. 3 a motion detecting light controller system 10. The motion detecting light controller system 10 comprises for example, a passive infra-red detector module 12 with internal power source 13(model BGE IR88) and a light bulb socket adapter 14 which includes a control circuit 16 for a light 19.

Figure 1:
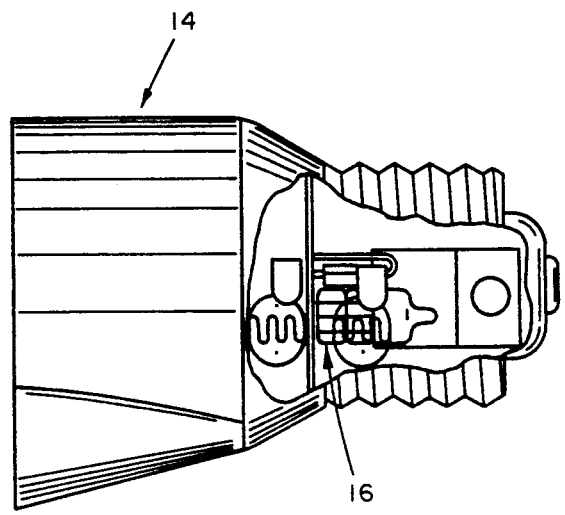
FIG. 1 is a side elevational view of a socket adapter for a motion detecting light controller system according to the present invention, partly broken away.
Figure 2:
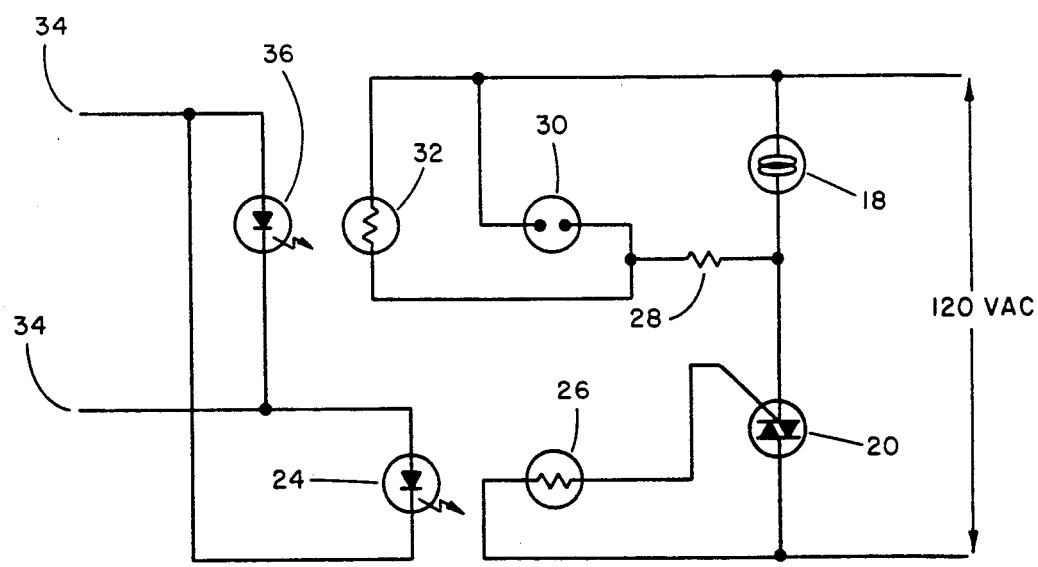
FIG. 2. is a schematic of the control circuit for a motion detecting light controller system according to the present invention.

The control circuit 16, shown pictorially in FIG. 1 and schematically in FIG. 2, includes a power switching triac 20 in series with the lamp 18, which is across a 120 v AC line. Let us say, both the power switching triac 20 and the lamp 18 are in the off state. If a pulse is emitted by the circuit of the infra-red detector 12 because an intruder or other individual 21 in its focused path 22 has been detected, the pulse is passed through the control input terminals 34 and with proper polarity, to the first LED 24 which is positioned in close physical proximity to a first photo cell 26 although it is not electrically connected thereto. The illumination of the first LED 24 activates the first photo cell 26 which goes from low conductivity to high conductivity turning on the power switching triac 20. The electrical current flowing through the power switching triac 20 turns on the lamp 18 in series with it and simultaneously applies power through a current limiting resistor 28 to a neon bulb 30 causing it to glow. The neon lamp 30 which is positioned in close physical proximity to the first photo cell 26 illuminates it maintaining the photo cell 26 in a highly conductive state even though the pulse from the infra red detector module 12 is no longer present. The neon lamp 30 continues to illuminate the first photo cell 26 maintaining the drive current holding the power switching triac 20 and the lamp 18 on. Without any further application of power to the control input terminals 34 the power switching triac 20 and the lamp 18 will remain on. A second pulse is now applied to the control input terminals 34 of opposite polarity from the original detector pulse mentioned hereinfore. This pulse illuminates a second LED 36 which is positioned in close physical proximity to a second photo cell 32 although it is not electrically connected thereto. The illumination of the second LED 36 activates the second photo cell 32 which goes from low conductivity to a higher conductivity. This change in conductivity forces the voltage across the neon lamp 30 to drop below that required for the neon lamp 30 to glow. When that occurs there is no illumination of the first photo cell 26 causing the first photo cell 26 to decrease in conductivity in turn causing the gate of the current power switching triac 20 to reduce turning of the lamp 18. Both control signals involve LED's 24, 26 that are electrically totally isolated from the 120 v AC line. The latching function is obtained strictly by optical means. A timer control circuit (not shown) such as can be provided by an IC type LM 555 can be utilized to apply the second pulse. The timer control circuit, in the preferred embodiment, is positioned in the infra-red detector module 12.

In operation, the infra-red detector module 12 is activated when it detects an individual in its focused area. The infra-red detector module 12 sends a pulse which is passed through the control input terminals 34 and to the first LED 24 starting the on pulse, latch up and power on phases of the system as explained hereinbefore. The light 19, a flood light for example, is illuminated and stays illuminated until the timing circuit send an off pulse which activates the second LED 36 turning the light 19 off.

What I claim Is:

1. A motion detecting light controller system comprising a motion detector, a power source, a light bulb socket adapter, a means of connecting the system to a 120 v AC line and a light, the light bulb socket adapter including a control circuit for the light, the motion detector and the light electrically connected to the control circuit, the control circuit having a first LED and a second LED, the first and second LEDs electrically isolated from the 120 v AC line.

2. A motion detecting light controller system as set forth in claim 1 wherein the control circuit includes a power switching triac in series with a lamp, the power switching triac and the lamp being across a 120 v AC line, the first LED positioned in close, spaced proximity to a first photo cell, the first photo cell electrically connected to the power switching triac, a neon bulb electrically connected to the power switching triac, the neon lamp being positioned in close physical proximity to the first photo cell whereby illumination of the first LED activates the first photo cell turning on the power switching triac and simultaneously applies power to the neon bulb activating it, the neon lamp illuminates the first photo cell maintaining the first photo cell in a highly conductive state maintaining the drive current holding the power switching triac and the lamp on.

3. A motion detecting light controller system as set forth in claim 2 wherein the control circuit further comprises a second photo cell positioned in spaced, proximate relation to the second LED and electrically connected to the neon bulb whereby a second pulse being applied to the second LED illuminates the second photo cell activating the second photo cell which goes from low conductivity to a higher conductivity forcing the voltage across the neon lamp to drop below that required for the neon lamp to glow, removing the illumination from the first photo cell causing the gate of the current power switching triac to reduce turning of the lamp and the light.

* * * * *